(12) United States Patent
Mairhofer et al.

(10) Patent No.: US 12,044,190 B2
(45) Date of Patent: Jul. 23, 2024

(54) INTERNAL COMBUSTION ENGINE

(71) Applicant: INNIO Jenbacher GmbH & Co OG, Jenbach (AT)

(72) Inventors: Alexander Mairhofer, Thiersee (AT); Johannes Huber, Kramsach (AT); Josef Thalhauser, Nußdorf (DE); Matthias Grotz, Innsbruck (AT); Michael Franz Litzlfellner, Uderns (AT); Alexander Gasteiger, Wörgl (AT); Michael Perktold, Biberwier (AT)

(73) Assignee: Innio Jenbacher GmbH & Co OG, Jenbach (AT)

( * ) Notice: Subject to any disclaimer, the term of this patent is extended or adjusted under 35 U.S.C. 154(b) by 0 days.

(21) Appl. No.: 18/103,391

(22) Filed: Jan. 30, 2023

(65) Prior Publication Data

US 2023/0175453 A1    Jun. 8, 2023

Related U.S. Application Data

(63) Continuation of application No. 17/437,418, filed as application No. PCT/AT2019/060083 on Mar. 13, 2019, now Pat. No. 11,572,847.

(51) Int. Cl.
   *F02D 41/38*    (2006.01)
   *F02D 41/00*    (2006.01)
   *F02D 41/12*    (2006.01)

(52) U.S. Cl.
   CPC ..... *F02D 41/3863* (2013.01); *F02D 41/0027* (2013.01); *F02D 41/12* (2013.01);
   (Continued)

(58) Field of Classification Search
   CPC ............. F02D 41/0027; F02D 41/12; F02D 2041/389; F02D 2200/0602; F02D 2250/31
   See application file for complete search history.

(56) References Cited

U.S. PATENT DOCUMENTS 4,505,249 A * 3/1985 Young ................ F02D 19/0628
                                                      123/577
5,967,176 A * 10/1999 Blann .................... F16K 31/365
                                                       137/489.5
(Continued)

FOREIGN PATENT DOCUMENTS

DE        3149839 A1    6/1983
DE    102013218690 A1    5/2014
(Continued)

OTHER PUBLICATIONS

PCT International Search Report and Written Opinion; Application No. PCT/AT2019/060083; dated Nov. 7, 2019; 15 pages.

*Primary Examiner* — Phutthiwat Wongwian
*Assistant Examiner* — Sherman D Manley
(74) *Attorney, Agent, or Firm* — Fletcher Yoder, P.C.

(57) ABSTRACT

An internal combustion engine with at least one combustion chamber, at least one fuel delivery line for the delivery of fuel to at least one combustion chamber, and at least one differential pressure control valve for controlling the pressure in the at least one fuel delivery line. The at least one differential pressure control valve is configured to perform a valve opening or valve closing movement based on a pressure difference between the at least one fuel delivery line and a reference volume having a reference pressure. The internal combustion engine further includes at least one pressure relief valve, separate from the at least one differential pressure control valve, and configured to open to cause a pressure relief in the reference volume and a (Continued)

decrease in the reference pressure if a drop occurs in the power to be performed by the internal combustion engine.

20 Claims, 2 Drawing Sheets

(52) U.S. Cl.
CPC .................. *F02D 2041/389* (2013.01); *F02D 2200/0602* (2013.01); *F02D 2250/31* (2013.01)

(56) References Cited

U.S. PATENT DOCUMENTS

| | | | | |
|---|---|---|---|---|
| 6,035,878 | A * | 3/2000 | Adams | G05D 16/2095 137/12 |
| 7,878,179 | B2 * | 2/2011 | Ikeya | F02M 37/0029 123/514 |
| 8,935,078 | B1 * | 1/2015 | Lorts | F02D 19/0678 123/457 |
| 9,027,534 | B2 * | 5/2015 | Kim | F02D 19/0623 123/456 |
| 9,243,588 | B2 * | 1/2016 | Pursifull | F02M 25/089 |
| 9,273,638 | B2 * | 3/2016 | Pursifull | F02M 21/0239 |
| 9,359,963 | B2 * | 6/2016 | Pursifull | F02D 19/022 |
| 9,732,713 | B2 * | 8/2017 | Bandyopadhyay | F02D 41/3047 |
| 9,850,807 | B2 | 12/2017 | Graus et al. | |
| 9,850,867 | B2 * | 12/2017 | Sugiyama | F02D 41/0027 |
| 10,817,003 | B2 * | 10/2020 | Amadini | G05D 16/2095 |
| 11,572,847 | B2 * | 2/2023 | Mairhofer | F02M 21/0242 |
| 2013/0125867 | A1 * | 5/2013 | Krug | F02D 19/0642 123/575 |
| 2014/0076283 | A1 * | 3/2014 | Pursifull | F02M 21/0239 123/457 |
| 2014/0081565 | A1 * | 3/2014 | Pursifull | F02D 19/022 123/457 |
| 2014/0305406 | A1 * | 10/2014 | Pursifull | F02M 57/026 123/434 |
| 2015/0134230 | A1 * | 5/2015 | Hoffmeyer | F02D 41/0007 701/103 |

FOREIGN PATENT DOCUMENTS

| | | |
|---|---|---|
| EP | 1058060 A1 | 12/2000 |
| EP | 3048279 A1 | 7/2016 |
| WO | 0079164 A1 | 12/2000 |

* cited by examiner

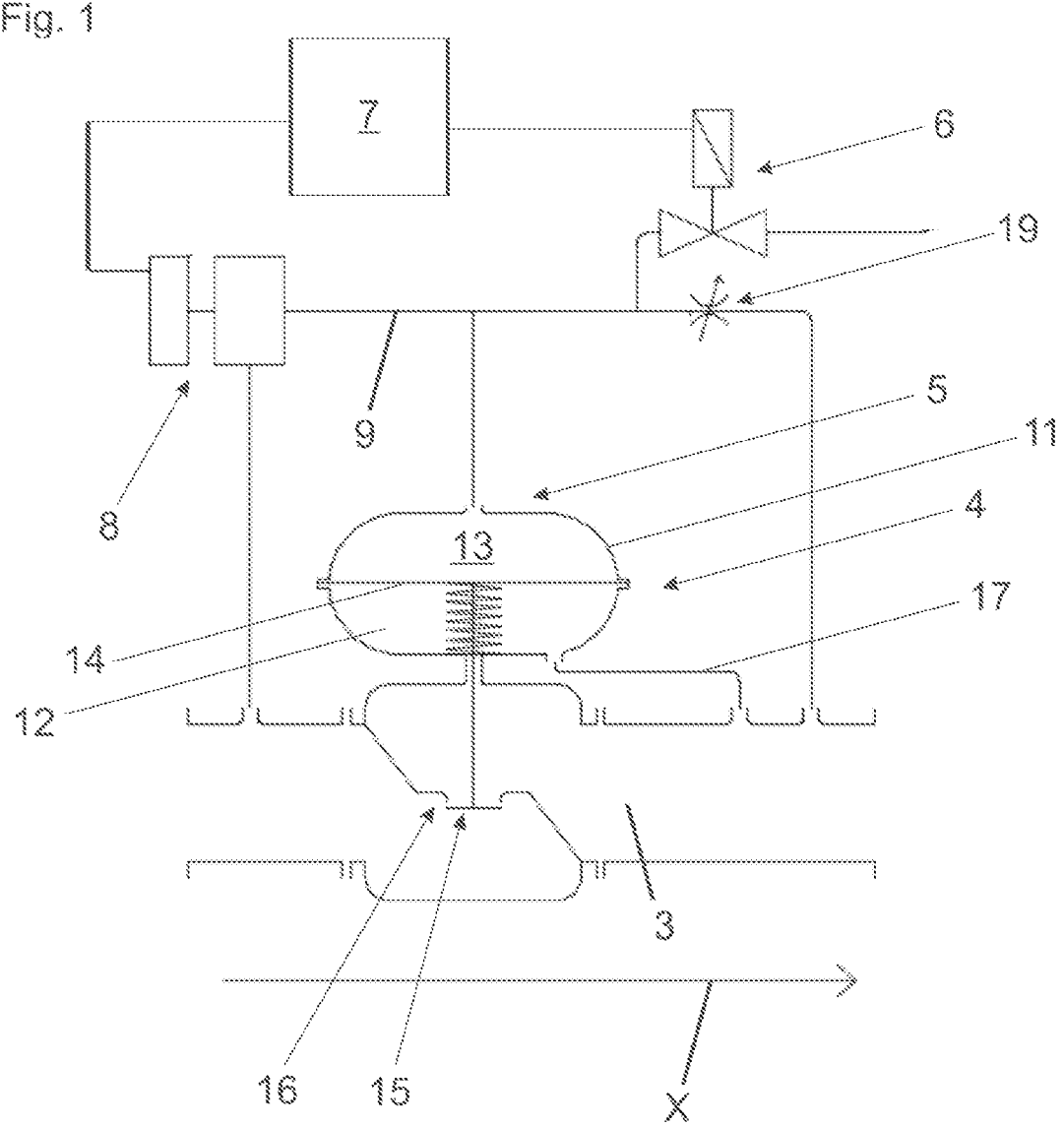

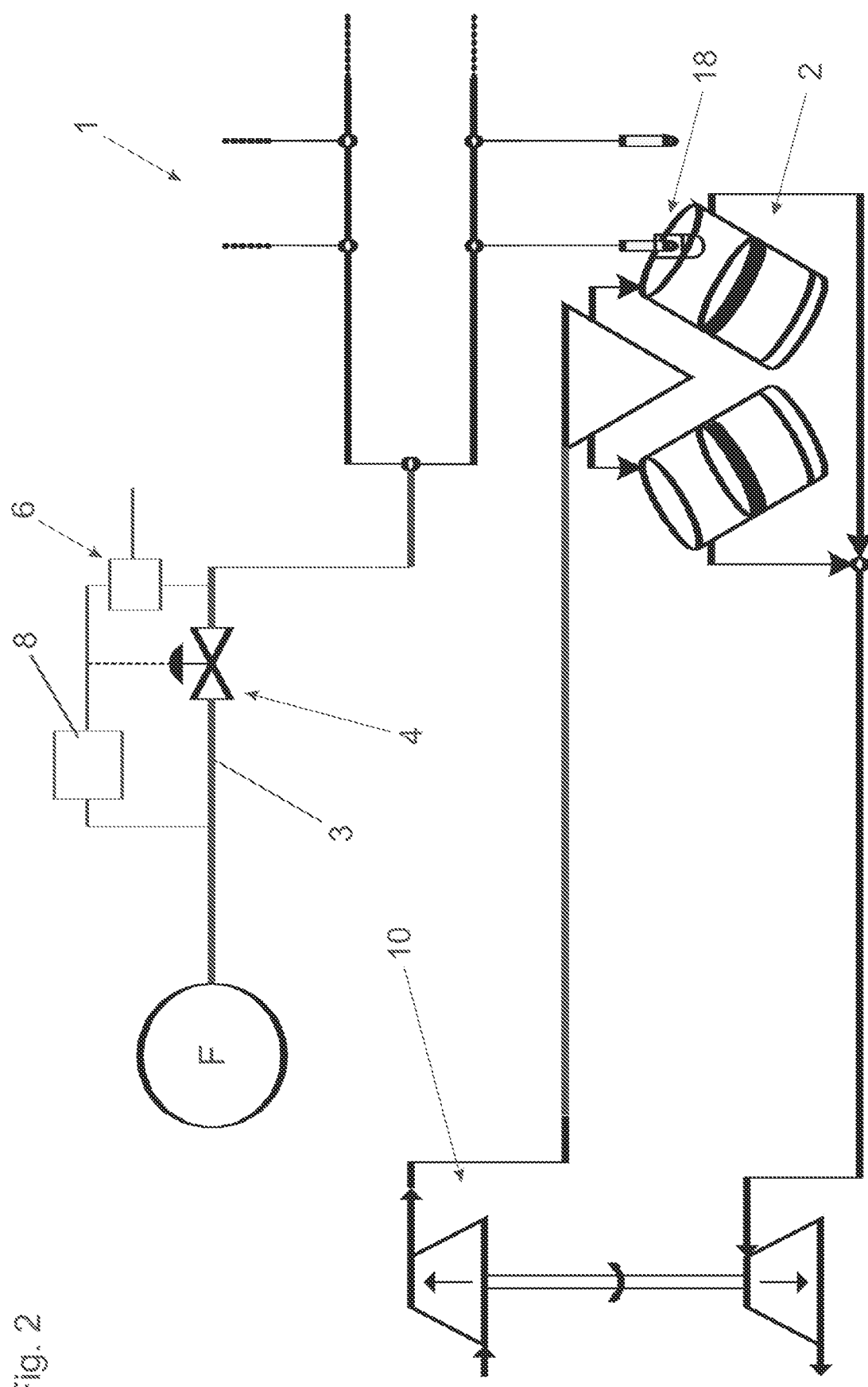

INTERNAL COMBUSTION ENGINE

CROSS-REFERENCE TO RELATED APPLICATIONS

This application is a continuation of U.S. patent application Ser. No. 17/437,418, entitled "INTERNAL COMBUSTION ENGINE", filed Sep. 9, 2021, which is a National Stage entry from, and claims benefit of, PCT Application No. PCT/AT2019/060083, filed on Mar. 13, 2019; entitled "INTERNAL COMBUSTION ENGINE", which are herein incorporated by reference in their entirety.

BACKGROUND

This invention relates to an internal combustion engine.

Internal combustion engines of the generic kind have at least one combustion chamber, at least one fuel delivery line for the delivery of—preferably gaseous—fuel to the at least one combustion chamber, and at least one differential pressure control valve for controlling the pressure in at least one fuel delivery line, wherein the at least one differential pressure control valve is configured to perform a valve opening or valve closing movement on the basis of a pressure difference between the at least one fuel delivery line and a reference volume, in which a reference pressure is present.

The following describes the prior art and the objective of the invention by means of an air charged gas engine. However, the statements made apply to internal combustion engines with a fuel delivery line in general, wherein the pressure in the fuel delivery line is controlled by a differential pressure control valve.

During delivery of charge air and fuel to the combustion chamber, the ratio between pressure in the fuel delivery line and the charge pressure must neither be too high nor too low. Failing this, the ratio of charge air and fuel in the combustion chamber is imbalanced. Especially in case of a load shedding, i.e., a—relatively rapid—reduction in the power to be produced by the internal combustion engine poses challenges to the control of the pressure in the fuel delivery line, because the charge pressure naturally decreases very quickly and consequently will adapt to the reduction in power. So, in most cases, the pressure control in the fuel delivery line reacts more slowly than the charge pressure.

It is to be noted that, as power increases (gradually), also the charge pressure and the pressure in the at least one fuel delivery line increase by a corresponding amount.

Due to the fact that pressure in the fuel delivery line decreases more slowly than the charge pressure, in case of larger load sheddings, the pressure ratio of these two parameters can exceed a limit above which the direct fuel injection valves or port injection valves are no longer able to open, which in turn leads to a suspension of the combustion. This undesired condition can last for several seconds.

A solution for a similar problem is described in EP 3 048 279 A1, although this only advises about measures that directly affect the volume of gas in the fuel delivery line.

Other embodiments known from the prior art can, for example, be found in DE 31 49 839 A1, DE 10 2013 218 690 A1 or EP 1 058 060 A1.

BRIEF DESCRIPTION

The objective of the present invention is to provide an internal combustion engine with a differential pressure control valve that permits faster control of the pressure in the fuel delivery line in the event of load sheddings.

This is done by having at least one pressure relief valve separate from the at least one differential pressure control valve that is configured to effect by opening a relief pressure in the reference volume and therefore a decrease of the reference pressure if the power to be performed by the internal combustion engine drops, especially if, substantially, the power to be performed by the internal combustion engine abruptly no longer needs to be performed (load shedding).

The insight of this invention is therefore that the at least one differential pressure control valve is completely able to control the pressure in the fuel delivery line (e.g., rail) fast enough if the pressure in the reference volume, in particular a pilot-controlled pressure in the reference volume, is adapted fast enough.

In this document, mechanically actuated actuators are designated as 'controlled' even if a mechanical feedback is provided. The expression 'feedback control' is only used in relation to an electronic closed-loop control system.

Preferably, the reference volume can take the form of a through-flow volume, in particular with pilot-controlled reference pressure. However, in principle, a static reference volume is also possible.

The at least one differential pressure control valve (hereinafter, a pressure control valve) can preferably be configured to perform a valve opening movement in case the reference pressure is higher than a prevailing pressure in the fuel delivery line, and to perform a valve closing movement in case the reference pressure is lower than a prevailing pressure in the fuel delivery line. In the first case, the valve opening movement will cause an increase in the volume flow through the pressure control valve, which in turn leads to an increased pressure in the fuel delivery line that is better adapted to the reference pressure, and vice versa.

To perform the valve opening movement and the valve closing movement, a valve body and/or a valve seat can be arranged in the at least one fuel delivery valve and can be able to move relative to one another.

The pressure in the at least one fuel delivery line always relates to the pressure controlled by the at least one differential pressure control valve downstream of the at least one differential pressure control valve.

Further advantageous embodiments of the present invention are defined in the dependent claims.

Preferably, the at least one pressure relief valve can be arranged in such way that the reference volume in an open position of the at least one pressure relief valve is in fluid communication with the environment, thereby providing pressure relief relative to the environment and therefore relative to the environmental pressure of approximately 1 bar. Additionally, using the at least one pressure relief valve, it is also possible quickly to relieve pressure excesses of more than 1 bar in the reference volume.

Alternatively, or additionally, the reference volume with through-flow may include a restrictor— preferably an orifice— for restricting the volume flow, and the at least one pressure relief valve can be arranged in a restrictor bypass line routed around the restrictor.

An open-loop or closed-loop control device, preferably electronic, can be provided for the internal combustion engine.

More preferably, the at least one pressure relief valve can be actuated electronically by means of the open-loop or closed-loop control device. This provides a particularly simple way of relieving pressure in the reference volume if the information about a load shedding in the open-loop or closed-loop control device is given, for example, detected by the sensors connected to the open-loop or closed-loop control device.

Therefore, pressure in the bypass line is also relieved if the target pressure in the reference volume is too high. Especially advantageous is pressure relief using the pressure relief valve in response to big load sheddings, assuring rapid decrease of the reference pressure and, consequently, also rapid decrease of the pressure in the fuel delivery line.

In this context, 'big load sheddings' means that the internal combustion engine suddenly needs to provide a fraction only, i.e., less than 80%, of the power delivered previously, but preferably less than 50% of the power being delivered prior to this point.

In one embodiment according to this invention, the reference pressure in the reference volume is open-loop or closed-loop controlled by a pilot control valve that is separate from the pressure relief valve, wherein preferably electronic actuation, in particular by means of the aforementioned open-loop or closed-loop control device, of the pilot control valve according to a target value is provided.

It is provided that the pilot control valve is arranged in a bypass line of the at least one differential pressure control valve with the bypass line being fluidly connected upstream and preferably also downstream of the at least one pressure control valve to the at least one fuel delivery line. In this way, it is particularly easy to provide a reference volume with through-flow by using the medium from the at least one fuel delivery line as medium for the reference pressure in the reference volume.

The pilot control valve controls the volume flow in the bypass line and therefore the pressure in the reference volume, wherein the pressure in the reference volume rises in response to a higher volume flow and falls in response to a lower volume flow (depending on the setting of the restrictor valve).

At least one turbocharger can be provided which in particular generates a charge air having a charge pressure for the at least one combustion chamber.

The open-loop or closed-loop control device can be configured to specify the target value for actuation of the pilot control valve on the basis of a charge pressure generated by the turbocharger. This constitutes a simple way for achieving a good ratio between the pressure in the fuel delivery line and the charge pressure.

The at least one differential pressure control valve can be in the form of a mechanically actuated pressure control valve.

The at least one differential pressure control valve can have a two-part pressure chamber, in which a first partial volume in the pressure chamber is fluidly connected to the at least one fuel delivery line and a second partial volume in the pressure chamber is part of the reference volume.

In such case, the reference volume can, for example, be formed by the second partial volume together with parts of the line that, for example, are arranged downstream of the pilot control valve.

Dividing the pressure chamber into two can be implemented by using a— preferably spring-loaded— movable diaphragm, wherein the diaphragm is movably connected to a valve body or a valve seat of the at least one differential pressure control valve.

Of course, other embodiments of the pressure control valve are conceivable, for example, with hydraulic pistons or lever arrangements.

It can be provided for the fluid connection between the first partial volume of the pressure chamber and the at least one fuel delivery line to be implemented by a control line which fluidly connects the first partial volume of the pressure chamber downstream of the valve seat and the valve body with the at least one fuel delivery line.

Fuel delivery to the at least one combustion chamber can be performed by at least one direct injection valve (also known as a port injection valve), wherein the at least one direct injection valve or port injection valve is fluidly connected with the at least one fuel delivery line for the supply of fuel.

The at least one combustion chamber can include a piston-cylinder unit and/or a pre-chamber for a piston-cylinder unit.

The internal combustion engine according to the invention can be a gas engine.

The internal combustion engine according to the invention can be a reciprocating piston engine with any desired number of piston-cylinder units.

The internal combustion engine can be part of a genset— that is to say, a combination of an internal combustion engine with a generator operated thereof for generating electrical power.

BRIEF DESCRIPTION OF THE DRAWINGS

Further advantages and details of this invention can be found in the Figures and in the related description of those Figures. In that respect, FIG. 1 shows a first shows a schematic view of an embodiment according to the invention; and FIG. 2 shows a schematic overview of an internal combustion engine according to the invention.

DETAILED DESCRIPTION

FIG. 1 shows the at least one fuel delivery line 3 with a through-flow into the direction that is indicated by the arrow with the reference X. The pressure in the at least one fuel delivery line 3 is controlled by a differential pressure control valve 4. For this purpose, a pressure chamber 11 is provided that is divided into a first partial volume 12 and a second partial volume 13. A spring-loaded movable diaphragm 14 takes care of the partition.

The first partial volume 12 is fluidly connected to the at least one fuel delivery line 3, i.e., in the first partial volume 12, there is substantially the same pressure as in the at least one fuel delivery line 3. The fluid connection between the at least one fuel delivery line 3 and the first partial volume 12 of the pressure chamber 11 is resolved by a control line 17 that is connected downstream of a valve body 15 and a valve seat 16 with the at least one fuel delivery line 3.

The second partial volume 13 is part of a reference volume 5 in which a reference pressure is present. Control of the reference pressure is described in further detail below.

The plate-shaped valve body 15 in this embodiment is movably connected to the diaphragm 14 by a rod. Differences in pressure between the first partial volume 12 and the second partial volume 13 cause movements in the spring-loaded movable diaphragm 14 that further leads to relative movements of the valve body 15 to the valve seat 16 arranged in the at least one fuel delivery line 3.

If the reference pressure in the second partial volume 13 is higher than the pressure in the at least one fuel delivery line 3, the diaphragm 14 moves downwards causing the valve body 15 to perform an opening movement, which then leads to an adjustment of the pressure in the at least one fuel delivery line 3 to the reference pressure. In turn, of course, pressure in the at least one fuel delivery line 3, which is higher than the reference pressure, leads to a closing movement of valve body 15 and, in this case, also leads to an adjustment of the pressure in the at least one fuel delivery line 3 to the reference pressure in the second partial volume 13.

For supplying the reference volume 5, a bypass line 9 of the at least one fuel delivery line 3 is provided around the differential pressure control valve 4. Initially, a pilot control valve 8 is present in this bypass line 9. The pilot control valve 8 controls the reference pressure that exists downstream of the pilot control valve 8 and, therefore, also in the second partial volume 13 that has a fluid connection with bypass line 9. Consequently, the parts of the line downstream of the pilot control valve 8 of the bypass line 9 and the second volume part 13 of the pressure chamber 11 form the reference volume 5.

An electronic open-loop or closed-loop control device 7 is provided that is connected to the pilot control valve 8. This connection specifies a target value for the reference pressure, which is defined, by way of example, on the basis of target or actual values for the charge pressure or power of the internal combustion engine.

The pilot control valve 8 is divided into two parts, in the illustration shown with a left-hand input-output part for converting the electronically specified target value into a mechanical actuator movement and a second mechanical section on the right.

According to the invention, a pressure relief valve 6 is provided which in this embodiment is also actuated by the open-loop or closed-loop control device 7. In the event of a drop in power, the open-loop or closed-loop control device 7 not only adapts the target value for the pilot control in the reference volume 5, it also opens the pressure relief valve 6. By this the reference volume 5 is opened relative to the environment, which can cause the reference pressure in reference volume 5 to drop rapidly, in particular with a similar speed as to the drop in charge pressure in response to a load shedding.

Consequently, the differential pressure control valve 4 performs a closing movement of the valve body 15 with only a slight delay, by which the pressure in the at least one fuel delivery line 3 drops as rapidly as the charge pressure.

A valve 19 in the bypass line 9 and downstream of the pilot control valve 8 substantially assumes the function of a restrictor (restrictor valve) with which a variable flow resistance can be induced and consequently a variable reference pressure can be built up. In the event of increased flow resistance, the pressure in the second partial volume 13 rises, causing an opposing movement of the diaphragm 14 to the spring force and resulting in an opening movement of valve body 15. In turn, an opening of the restrictor 19 leads to a decrease of the reference pressure in the second partial volume 13, causing the valve body 15 to perform a closing movement, which in turn results in a pressure reduction in the fuel delivery line 3.

FIG. 2 shows the embodiment according to FIG. 1 in a schematic diagram of the internal combustion engine 1. In addition to the turbocharger 10 that provides a charge pressure for supplying the combustion chambers 2 in the form of piston-cylinder units, the differential pressure control valve 4 in the at least one fuel delivery line 3 as well as the pilot control valve 8 and the pressure relief valve 6 according to the invention are shown in the form of symbols. In most internal combustion engines 1 of this kind, the pressure in the at least one fuel delivery line 3 is always higher than the charge pressure.

Reference symbol F indicates a fuel reservoir that takes the form of a gas pressure vessel in this embodiment.

The delivery of the charge air generated by the turbocharger 10 to the piston-cylinder units is realized via a distributor space illustrated by a triangular symbol.

Separately, each piston-cylinder unit is equipped with one direct injection or port injection valve 18.

It is to be noted that the fuel, preferably gaseous fuel, is injected into the area of what is known as the 'intake port' by port injection valve 18.

The correct functional method for the direct injection valve or port injection valve 18 requires that the ratio between the pressure in the at least one fuel delivery line 3 and the charge pressure does not exceed a specific value.

Without the pressure relief valve 6 according to the invention, it can happen that the charge pressure drops so fast (e.g., due to a major load shedding) that the control line for the pressure in the at least one fuel delivery line 3 is too slow. The ratio referred to then becomes too great, meaning that the port injection valves 18 are then no longer able to open, which, of course, causes disruptions to the correct operation of the internal combustion engine 1.

The pressure relief valve 6 according to the invention delivers a fast adjustment of the reference pressure and, therefore, of the pressure in the at least one fuel delivery line 3, preventing the afore-mentioned disruptions. Subsequently, the internal combustion engine 1 consumes excess fuel from the at least one fuel delivery line 3 until the balance in the at least one fuel delivery line 3 is restored.

The invention claimed is:

1. A system, comprising:
a pressure control valve configured to couple to a fuel delivery line that delivers a fuel flow to at least one combustion chamber of an internal combustion engine, wherein the pressure control valve is adjustable to control a fuel pressure of the fuel flow; and
a controller configured to control the pressure control valve to control a ratio between the fuel pressure and an air charge pressure of an air flow delivered to the at least one combustion chamber, wherein the controller is configured to control the ratio based on at least one threshold value, and the controller is configured to control a pressure relief valve to adjust the pressure control valve in response to a change in the air charge pressure while a compressor operates to generate the air charge pressure.

2. The system of claim 1, wherein the at least one threshold value comprises a high threshold.

3. The system of claim 2, wherein the at least one threshold value comprises a low threshold.

4. The system of claim 1, wherein the controller is configured to control the ratio based on the at least one threshold value in response to a load shedding on the internal combustion engine resulting in a power reduction of at least 50 percent or more.

5. The system of claim 4, wherein the controller is configured to control the ratio based on the at least one threshold value in response to a decrease in the air charge pressure associated with the load shedding by providing a corresponding decrease in the fuel pressure to ensure that the ratio is between a high threshold and a low threshold.

6. The system of claim 1, wherein the controller is configured to control the ratio at least by adjusting the pressure control valve based on an input indicating the change in the air charge pressure.

7. The system of claim 6, wherein the input comprises a target or actual value for the air charge pressure.

8. The system of claim 1, wherein the pressure control valve comprises a differential pressure control valve configured to move in response to a difference between a reference pressure and the fuel pressure, and the controller is configured to adjust the reference pressure to control the ratio.

9. The system of claim 8, wherein the controller is configured to control a pilot control valve and the pressure relief valve to adjust the reference pressure, the pilot control valve and the pressure relief valve are coupled to a bypass line, and the bypass line is coupled to the fuel delivery line upstream and downstream of the differential pressure control valve.

10. The system of claim 1, comprising the pressure relief valve configured to couple to a bypass line that couples to the fuel delivery line upstream and downstream of the pressure control valve.

11. The system of claim 1, comprising the internal combustion engine coupled to the fuel delivery line having the pressure control valve.

12. The system of claim 11, comprising a turbocharger coupled to the internal combustion engine, wherein the turbocharger comprises the compressor configured to deliver the air flow at the air charge pressure to the at least one combustion chamber.

13. A system, comprising:
a controller configured to control a pressure control valve along a fuel delivery line that delivers a fuel flow to at least one combustion chamber of an internal combustion engine, wherein the pressure control valve is adjustable to control a fuel pressure of the fuel flow, wherein the controller is configured to control a ratio between the fuel pressure and an air charge pressure of an air flow delivered to the at least one combustion chamber, wherein the controller is configured to control the ratio based on at least one threshold value, and the controller is configured to control a pressure relief valve to adjust the pressure control valve in response to a change in the air charge pressure while a compressor operates to generate the air charge pressure.

14. The system of claim 13, wherein the at least one threshold value comprises a high threshold and a low threshold.

15. The system of claim 14, wherein the controller is configured to control the ratio based on the at least one threshold value in response to a load shedding on the internal combustion engine resulting in a power reduction of at least 50 percent or more, wherein the controller is configured to control the ratio based on the at least one threshold value in response to a decrease in the air charge pressure associated with the load shedding by providing a corresponding decrease in the fuel pressure to ensure that the ratio is between the high threshold and the low threshold.

16. The system of claim 13, wherein the controller is configured to control the ratio at least by adjusting the pressure control valve based on an input indicating the change in the air charge pressure.

17. The system of claim 13, wherein pressure control valve comprises a differential pressure control valve configured to move in response to a difference between a reference pressure and the fuel pressure, wherein the controller is configured to adjust the reference pressure to control the ratio.

18. A method, comprising:
adjusting a fuel pressure via a pressure control valve coupled to a fuel delivery line that delivers a fuel flow to at least one combustion chamber of an internal combustion engine; and
controlling the pressure control valve to control a ratio between the fuel pressure and an air charge pressure of an air flow delivered to the at least one combustion chamber, wherein the control of the ratio is based on at least one threshold value, wherein controlling the pressure control valve comprises controlling a pressure relief valve to adjust the pressure control valve in response to a change in the air charge pressure while a compressor operates to generate the air charge pressure.

19. The method of claim 18, wherein controlling the pressure control valve to control the ratio based on the at least one threshold value is in response to a load shedding on the internal combustion engine resulting in a power reduction of at least 50 percent or more, wherein controlling the pressure control valve to control the ratio based on the at least one threshold value is in response to a decrease in the air charge pressure associated with the load shedding by providing a corresponding decrease in the fuel pressure to ensure that the ratio is between a high threshold and a low threshold.

20. The method of claim 18, wherein controlling the pressure control valve to control the ratio based on the at least one threshold value comprises adjusting the pressure control valve based on an input indicating the change in the air charge pressure.

* * * * *